United States Patent
Chung et al.

(10) Patent No.: US 11,951,672 B2
(45) Date of Patent: Apr. 9, 2024

(54) MULTI-MATERIAL FIBERS AND METHODS OF MANUFACTURING THE SAME

(71) Applicants: Advanced Functional Fabrics of America, Inc., Cambridge, MA (US); Massachusetts Institute of Technology, Cambridge, MA (US)

(72) Inventors: Chia-Chun Chung, Malden, MA (US); Jason Cox, Ashland, MA (US); Kristina McCarthy, Oxford, MA (US); Kristen Mulherin, Newton, MA (US); Jimmy Nguyen, Lowell, MA (US); Michael Rein, Boston, MA (US); Matthew Bernasconi, Concord, MA (US); Lauren Cantley, Cambridge, MA (US); Lalitha Parameswaran, Billerica, MA (US); Michael Rickley, Reading, MA (US); Alexander Stolyarov, Belmont, MA (US)

(73) Assignees: Advanced Functional Fabrics of America, Inc., Cambridge, MA (US); Massachusetts Institute of Technology, Cambridge, MA (US)

( * ) Notice: Subject to any disclaimer, the term of this patent is extended or adjusted under 35 U.S.C. 154(b) by 497 days.

(21) Appl. No.: 17/236,351

(22) Filed: Apr. 21, 2021

(65) Prior Publication Data
US 2021/0362396 A1 Nov. 25, 2021

Related U.S. Application Data

(60) Provisional application No. 63/015,109, filed on Apr. 24, 2020.

(51) Int. Cl.
*B23K 1/00* (2006.01)
*B29C 51/00* (2006.01)
(Continued)

(52) U.S. Cl.
CPC .......... *B29C 51/004* (2013.01); *B23K 1/0016* (2013.01); *B29C 51/12* (2013.01);
(Continued)

(58) Field of Classification Search
CPC ..... B29C 51/004; B29C 51/12; B29C 70/021; B29C 70/88; B29D 11/00701;
(Continued)

(56) References Cited

U.S. PATENT DOCUMENTS 7,900,349 B2 * 3/2011 Han .................... H01L 23/5389
29/840
10,081,887 B2 9/2018 Manipatruni et al.
(Continued)

FOREIGN PATENT DOCUMENTS

EP 3388143 A1 * 10/2018 ............ B29C 51/12
WO WO-2015175061 A2 11/2015
(Continued)

OTHER PUBLICATIONS

International Search Report and Written Opinion in PCT/US2021/028347, dated Jul. 15, 2021 14 pages.
(Continued)

*Primary Examiner* — Kiley S Stoner
(74) *Attorney, Agent, or Firm* — Goodwin Procter LLP

(57) ABSTRACT

Methods of manufacturing multi-material fibers having one or more electrically-connectable devices disposed therein are described. In certain instances, the methods include the steps of: positioning the electrically-connectable device(s) within a corresponding pocket provided in a preform material; positioning a first electrical conductor longitudinally within a first conduit provided in the preform material; and drawing the multi-material fiber by causing the preform material to flow, such that the first electrical conductor extends within the multi-material fiber along a longitudinal
(Continued)

axis thereof and makes an electrical contact with a first electrode located on each electrically-connectable device. A metallurgical bond may be formed between the first electrical conductor and the first electrode while drawing the multi-material fiber and/or, after drawing the multi-material fiber, the first electrical conductor may be located substantially along a neutral axis of the multi-material fiber.

12 Claims, 10 Drawing Sheets

(51) Int. Cl.
- *B29C 51/12* (2006.01)
- *B29D 11/00* (2006.01)
- *B29D 99/00* (2010.01)
- *D01D 5/00* (2006.01)
- *B29L 11/00* (2006.01)

(52) U.S. Cl.
CPC .. *B29D 11/00701* (2013.01); *B29D 11/00721* (2013.01); *B29D 99/0078* (2013.01); *D01D 5/00* (2013.01); *B29L 2011/0075* (2013.01)

(58) Field of Classification Search
CPC .......... B29D 11/00721; B29D 99/0078; D01D 5/00; B29L 2011/0075; B23K 1/00–206; B23K 2101/36–42; B23K 2101/22; B23K 2103/38

USPC ......................................... 228/179.1–180.22
See application file for complete search history.

(56) References Cited

U.S. PATENT DOCUMENTS

| | | | |
|---|---|---|---|
| 10,147,854 B2 * | 12/2018 | Shatalov | H01L 33/0095 |
| 2005/0146076 A1 * | 7/2005 | Alexander | B29C 70/24 |
| | | | 264/257 |
| 2013/0145588 A1 | 6/2013 | Nakata | |
| 2014/0025007 A1 | 1/2014 | Fink et al. | |
| 2016/0281267 A1 * | 9/2016 | Wetzel | B29C 66/5241 |
| 2018/0039036 A1 * | 2/2018 | Fink | F21S 4/15 |
| 2018/0141274 A1 | 5/2018 | Fink et al. | |
| 2018/0327931 A1 * | 11/2018 | Sorin | D01D 5/00 |
| 2019/0021407 A1 | 1/2019 | Howland | |
| 2022/0025551 A1 | 1/2022 | Wei et al. | |

FOREIGN PATENT DOCUMENTS

| | | |
|---|---|---|
| WO | WO-2018231809 A1 | 12/2018 |
| WO | WO-2020081005 A1 | 4/2020 |

OTHER PUBLICATIONS

International Search Report and Written Opinion in PCT/US2021/028351, dated Jul. 15, 2021 15 pages.

* cited by examiner

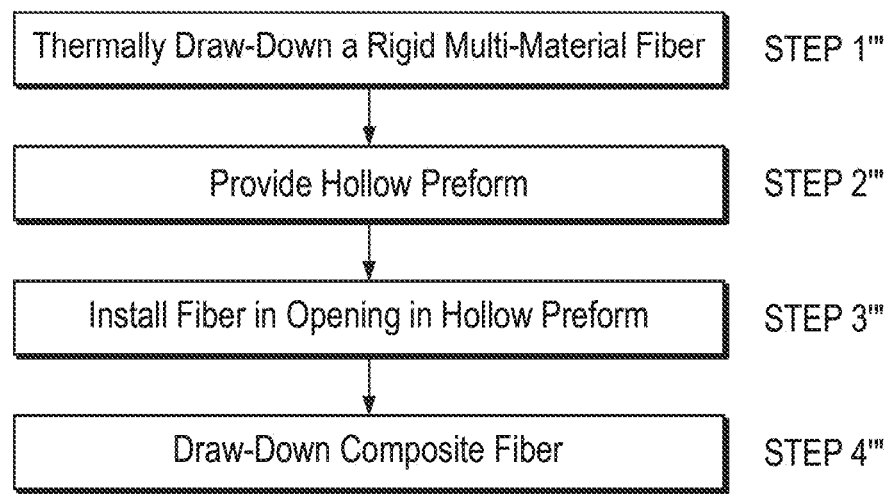
FIG. 14
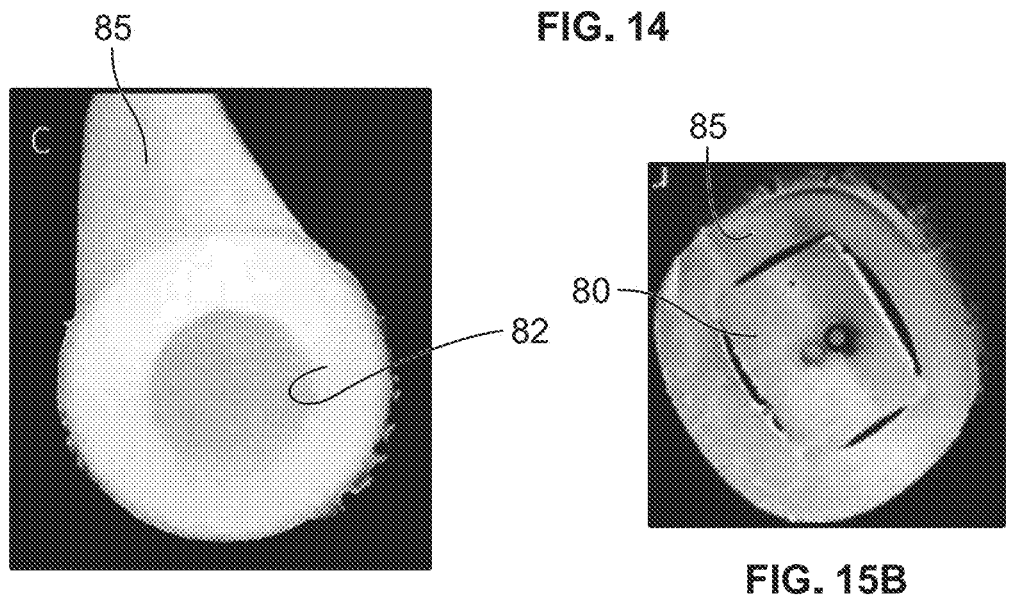
FIG. 15A
FIG. 15B
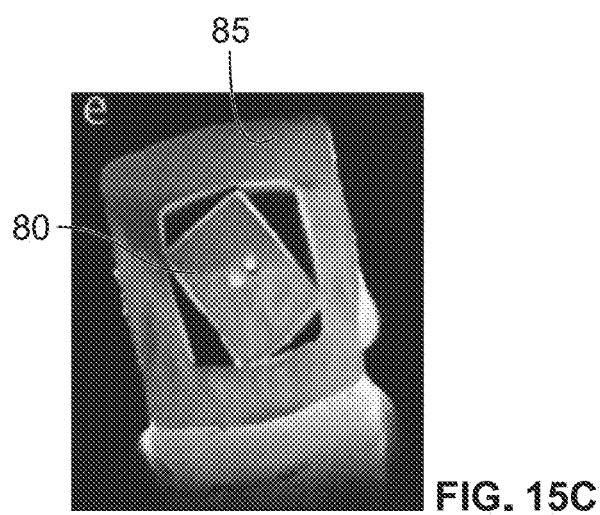
FIG. 15C

MULTI-MATERIAL FIBERS AND METHODS OF MANUFACTURING THE SAME

CROSS-REFERENCE TO RELATED APPLICATION

This application claims priority to and the benefit of U.S. Provisional Patent Application No. 63/015,109 filed on Apr. 24, 2020, the disclosure of which is incorporated herein by reference in its entirety.

STATEMENT REGARDING FEDERALLY SPONSORED RESEARCH OR DEVELOPMENT

This invention was made with U.S. Government support under Agreement Number W15QKN-16-3-0001 awarded by the Army Contracting Command-New Jersey (ACC-NJ). The Government has certain rights in the invention.

FIELD OF THE INVENTION

Embodiments of the present invention relate generally to the field of drawing multi-material fibers from a preform material and, more specifically, to methods of drawing multi-material fibers for use in textiles and garments.

BACKGROUND OF THE INVENTION

The incorporation of semiconductor technology within fibers, producing multi-material fibers, promises to revolutionize the textile market, converting traditional fibers, filaments, yarns, and the like into sophisticated devices. These multi-material fibers can endow the textiles into which they are intertwined with functions that may yield services to the end-user.

Conventional media for communication of data include wireless communication systems (e.g., WiFi), vacuum or fiber optic cable systems, hard-wired (cable) communication systems, and the like. The abundance of communication devices operating in and thereby saturating the radiofrequency (RF) domain demonstrates a need for new communication media. Advantageously, free space optical (FSO) communication provides a communication medium offering secure, line-of-sight (LoS), high-bandwidth data transmission to send information from one location to another using light.

More specifically, FSO communication propagates electromagnetic (EM) radiation through the air wherever light can travel, but only where light can travel. Advantageously, optical wireless communication systems operate in the visible to near infra-red (NIR) portion of the light spectrum, which offers $10^4$ times more bandwidth compared to the RF region of most wireless communication systems.

Until recently, the fusion of FSO technology with textiles, e.g., wearable garments, has been negligible. However, because the average human body provides 1.5 to 2 square meters of surface area, which is fertile space for receiving FSO signals, especially in the context of LoS communications, opportunities for such fusion exist.

As multi-material fibers are developed, a prerequisite for successful productization of the technology is the development of reliable, robust, functional fibers that are capable of surviving the rigors of typical textile use cases. For example, over their usable life, all textiles, including those that contain multi-material fibers, should be capable of undergoing significant mechanical and environmental abuse (e.g., bending, stretching, twisting, machine washing, exposure to sunlight, exposure to temperature changes, and so forth) that expose the textile to a myriad of force types (e.g., tension, compression, torsion, and so forth). Conventional multi-material fibers are limited in their abilities to withstand these stimuli.

Indeed, in developing multi-material fibers, the textile industry has learned that standard thermoplastics, cross-sectional architectures, and internal electrical and electronic connection strategies cannot produce fibers with adequate reliability with respect to, for example, bend testing, machine washing, fabric incorporation, and/or use case survivability. Moreover, the incorporation of semiconductor devices at the preform fabrication stage may affect the resulting multi-material fiber by: limiting control over the location of the devices at the fiber level, reducing the density of devices per unit length that can be incorporated in the fibers, and/or restricting the types of cladding material(s) that can be used. These limitations may lead to lower yields as the number of connections between multi-material fibers intertwined in the textile increases.

Accordingly, a need exists for improved multi-material fibers and methods of manufacturing the same.

SUMMARY OF THE INVENTION

In a first aspect, embodiments of the present invention relate to a method of manufacturing a multi-material fiber having one or more electrically-connectable devices. In some embodiments, the method may include the steps of: positioning each electrically-connectable device within a corresponding pocket provided in a preform material; positioning a first electrical conductor longitudinally within a first conduit provided in the preform material; and drawing the multi-material fiber by causing the preform material to flow, such that the first electrical conductor extends within the multi-material fiber along a longitudinal axis thereof and makes an electrical contact with a first electrode located on each electrically-connectable device. In pertinent part, a metallurgical bond may be formed between the first electrical conductor and the first electrode while drawing the multi-material fiber and/or, after drawing the multi-material fiber, the first electrical conductor may be located substantially along a neutral axis of the multi-material fiber. Alternatively, after drawing the multi-material fiber, the connection between the first electrical conductor and the first electrode of each electrically-connectable device may be located substantially along the neutral axis of the multi-material fiber.

In further applications, the method may include positioning a second electrical conductor longitudinally within a second conduit provided in the preform material and drawing the multi-material fiber by causing the preform material to flow, such that the second electrical conductor extends within the multi-material fiber along the longitudinal axis thereof and makes an electrical contact with a second electrode located on each electrically-connectable device. Advantageously, during the drawing, a metallurgical bond may be formed between the second electrical conductor and the second electrode and/or, after drawing the multi-material fiber, the second electrical conductor may be located substantially along the neutral axis of the multi-material fiber. Alternatively, after drawing the multi-material fiber, the connection between the second electrical conductor and the second electrode of each electrically-connectable device may be located substantially along the neutral axis of the multi-material fiber.

In some implementations, positioning the first electrical conductor may include positioning a copper alloy wire (e.g., a copper wire with a silver coating) within the first conduit. A bonding material (e.g., a metal alloy material such as a tin-bismuth solder) may be deposited on the first electrode prior to drawing the multi-material fiber. Preferably, the melting point of the bonding material substantially matches a glass transition temperature of the preform material. In some variations, depositing the bonding material on the first electrode utilizes a hot press device.

In further implementations, the method may also include one or more of the following: controlling an aspect ratio (e.g., to be between about 1.1:1 and about 2.7:1) of the drawn multi-material fiber; overcoating the drawn multi-material fiber (e.g., using a thermoplastic elastomer material as an overcoat); positioning a support wire longitudinally within an additional conduit in the preform material to provide mechanical stability to each electrically-connectable device, such that, after the multi-material fiber is drawn, the support wire contacts each electrically-connectable device without making electrical contact with the first electrical conductor or the first electrode; and positioning one or more outer wires longitudinally within a corresponding conduit in the preform material, so that, after drawing the multi-material fiber, each outer wire may be located substantially along the neutral axis of the drawn multi-material fiber. In some variations, controlling the aspect ratio may include adding sidewalls to the drawn multi-material fiber. Sidewalls may be made of materials that are any one of: the same as the preform material, materials having the same or substantially the same glass transition temperature as the preform material but having other mechanical properties that differ, and the like. Advantageously, the twisting behavior can be better tuned (e.g., against twisting behavior) if the sidewalls have the same or substantially the same glass transition temperature of the preform material but have other mechanical properties that differ.

In some embodiments, the method may also include interlacing the drawn multi-material fiber with additional fibers to form a textile. In some applications, the method may include adding rigidity to the textile, for example by one or more of: adding tubing to the textile; adding a plurality of stiffeners to the textile; adding a backing to the textile; and/or adding a ribbon-cable backing to the textile. In some variations, the method may further include wrapping the drawn multi-material fiber with an overwrap (e.g., cotton, polyester or any other textile yarn, high performance filaments, and/or high tensile strength fibers, such as aramids, dyneema, basalt fibers, and the like) prior to the interlacing and/or producing a composite yarn that includes a high modulus and/or high strength mono- or multi-filament yarn placed in parallel with a multi-material fiber and overwrapping the composite yarn with similar or other textile yarns.

In a second aspect, embodiments of the present invention relate to a textile that includes one or more multi-material fibers and additional fibers interlaced with the multi-material fiber(s). In some embodiments, the multi-material fiber may include a cladding material, an electrically-connectable device (e.g., a photodetector or a photodiode) disposed within the cladding material, and a first electrical conductor (e.g., a copper wire, a copper wire having a silver coating, a tungsten wire, a high tension wire, or an extra high tension wire) disposed within the cladding material and in electrical communication with a first electrode on the electrically-connectable device. In pertinent part, the first electrical conductor may be in electrical communication with the first electrode via a first metallurgical bond whose bonding material (e.g., a metal alloy material, such as a solder made of tin and bismuth) has a melting temperature that substantially matches a glass transition temperature of the cladding material and/or the first electrical conductor may be located substantially along a neutral axis of the multi-material fiber. Alternatively, after drawing the multi-material fiber, the connection between the first electrical conductor and the first electrode of the electrically-connectable device may be located substantially along the neutral axis of the multi-material fiber.

In some implementations, the multi-material fiber may further include a second electrical conductor in electrical communication with a second electrode on the electrically-connectable device. The second electrical conductor may be in electrical communication with the second electrode via a second metallurgical bond whose bonding material has a melting temperature that substantially matches the glass transition temperature of the cladding material and/or the second electrical conductor may be located substantially along the neutral axis of the multi-material fiber. Alternatively, after drawing the multi-material fiber, the connection between the second electrical conductor and the second electrode of the electrically-connectable device may be located substantially along the neutral axis of the multi-material fiber.

In some applications, the multi-material fiber may have one or more of the following: an aspect ratio between about 1.1:1 and about 2.7:1; an overcoating (e.g., a thermoplastic elastomer material); an overwrap (e.g., cotton, polyester or any other textile yarn, high performance filaments, and/or high tensile strength fibers, such as aramids, dyneema, basalt fibers, and the like), a support wire to provide mechanical stability to the device, and/or one or more outer wires (e.g., wires made from aramids, dyneema, tungsten, and so forth) that are located substantially along the neutral axis of the multi-material fiber. Alternatively, the multi-material fiber may include a composite yarn that includes a high modulus and/or high strength mono- or multi-filament yarn placed in parallel with the multi-material fiber and overwrapping the composite yarn with similar or other textile yarns.

In a third aspect, embodiments of the present invention relate to a method of manufacturing a multi-material fiber having one or more electrically-connectable devices. In some embodiments, the method may include the steps of: positioning a first electrical conductor longitudinally within a first conduit provided in a preform material; drawing the multi-material fiber by causing the preform material to flow; creating one or more pockets (e.g., by removing preform material using a laser and/or a milling machine) in the drawn multi-material fiber to expose the first electrical conductor; positioning an electrically-connectable device within each pocket, such that a first electrode on the electrically-connectable device is aligned with the first electrical conductor; forming a metallurgical bond between the first electrical conductor and the first electrode; and filling each pocket with an encapsulate material or an epoxy to protect the electrically-connectable device.

In some implementations, the method may also include positioning a second electrical conductor longitudinally within a second conduit provided in the preform material. In some variations: a pocket may be created to expose the second electrical conductor, the electrically-connectable device may be positioned within the pocket, such that a second electrode on the electrically-connectable device is aligned with the second electrical conductor, and/or a metallurgical bond between the second electrical conductor and the second electrode may be formed.

In further applications, the method may include one or more of: minimizing fluctuation of an outer diameter of the drawn multi-material fiber; coating the first electrode with a bonding material before the electrically-connectable device is positioned within the pocket; interlacing the drawn multi-material fiber with additional fibers to form a textile; removing preform material in a first drawn multi-material fiber in the textile to expose electrical conductors of the first drawn multi-material fiber; removing preform material in a second drawn multi-material fiber that, in the textile, intersects the first drawn multi-material fiber to expose electrical conductors of the second drawn multi-material fiber; and interconnecting the electrical conductors of the first drawn multi-material fiber to the electrical conductors of the second drawn multi-material fiber. In some variations, interconnecting the electrical conductors of the first drawn multi-material fiber to the electrical conductors of the second drawn multi-material fiber includes inserting one or more of an interposer or a transposer therebetween.

In a fourth aspect, embodiments of the present invention relate to a textile that includes one or more multi-material fibers and additional fibers interlaced with the multi-material fiber(s). In some implementations, the multi-material fiber includes a drawn preform material (e.g., a thermoplastic material, a thermoplastic elastomer (e.g., polyetherimide (PEI)), or glass), an electrically-connectable device (e.g., a photodetector or a photodiode) disposed within the drawn preform material, and a first electrical conductor (e.g., a copper wire, a copper wire comprising a silver coating, a tungsten wire, a high tension wire, or an extra high tension wire) disposed within the drawn preform material and in electrical communication with the electrically-connectable device. Preferably, the electrically-connectable device and some portion of the first electrical conductor are disposed in a pocket filled with a filling material or encapsulant (e.g., a photocured epoxy) to protect the electrically-connectable device.

In some applications, the multi-material fiber may further include a second electrical conductor disposed within the drawn preform material and in electrical communication with the electrically-connectable device. In some variations, a first electrode of the electrically-connectable device is bonded to the first electrical conductor via a bonding material and/or the first electrical conductor is located substantially along a neutral axis of the multi-material fiber. Alternatively, the connection between the first electrical conductor and the first electrode of the electrically-connectable device may be located substantially along the neutral axis of the multi-material fiber.

In some applications, the multi-material fiber may have one or more of the following: an aspect ratio between about 1.1:1 and about 2.7:1; an overcoating (e.g., a thermoplastic elastomer material); an overwrap (e.g., cotton, polyester or any other textile yarn, high performance filaments, and/or high tensile strength fibers, such as aramids, dyneema, basalt fibers, and the like), a support wire to provide mechanical stability to the device, and/or one or more outer wires (e.g., wires made from aramids, dyneema, tungsten, and so forth) that are located substantially along the neutral axis of the multi-material fiber. Alternatively, the multi-material fiber may include a composite yarn that includes a high modulus and/or high strength mono- or multi-filament yarn placed in parallel with the multi-material fiber and overwrapping the composite yarn with similar or other textile yarns.

In a fifth aspect, embodiments of the present invention relate to a method of manufacturing a multi-material fiber having one or more electrically-connectable devices. In some embodiments, the method includes the steps of: fabricating a core portion of a composite preform, encasing the core portion within an outer sheath portion to form the composite preform, and thermally drawing the composite preform. In some implementations, the core portion includes a core material, one or more electrically-connectable devices, and one or more electrical conductors in electrical communication with the electrically-connectable devices. In some applications, the core portion and the outer sheath portion are manufactured from different materials having substantially similar glass transition temperatures. For example, the core portion may be manufactured from a thermoplastic (e.g., a cyclic olefin copolymer (COC)) and the outer sheath portion may be manufactured from a thermoplastic elastomer (e.g., an elastomeric-cyclic olefin copolymer (e-COC)).

In some variations, fabricating the core portion may include one or more of: providing multiple layers of the core material; forming a slot in at least two of the layers (e.g., in a first layer and a second layer); forming a pocket in a third layer disposed between the first and second layers; positioning a first electrical conductor in a first slot in the first layer; positioning a second electrical conductor in a second slot in the second layer; positioning an electrically-connectable device in the pocket in the third layer; and consolidating the first, second, and third layers (e.g., using a hot press device) to form the core portion. In some embodiments, encasing the core portion may include: placing the core portion between first and second clam shell portions of the outer sheath portion and consolidating the core portion, the first clam shell portion, and the second clam shell portion (e.g., using a hot press device). In some applications, the method may also include interlacing the drawn multi-material fiber with additional fibers to form a textile.

In a sixth aspect, embodiments of the present invention relate to a textile. In some embodiments, the textile includes one or more multi-material fibers and additional fibers interlaced with the multi-material fiber(s). In some applications, the multi-material fiber includes a composite material, an electrically-connectable device disposed within the composite material, and one or more electrical conductors disposed within the composite material and in electrical communication with the electrically-connectable device. Preferably, the composite material includes a first preform material having a first glass transition temperature and a second preform material having a second glass transition temperature substantially similar to the first glass transition temperature and encasing the first preform material. In some variations, the electrically-connectable device and the electrical conductor(s) are disposed in the first preform material.

In a seventh aspect, embodiments of the present invention relate to a method of manufacturing a multi-material fiber having one or more electrically-connectable devices. In some embodiments, the method may include the steps of: thermally drawing a core preform, manufactured from a first material (e.g., thermoplastic polycarbonate), at a first temperature to produce a first drawn fiber; inserting the first drawn fiber within a hollow portion of a second preform to form a composite preform, wherein the second preform is manufactured from a second material (e.g., an elastomeric-cyclic olefin copolymer (e-COC)) that differs from the first material; and thermally drawing the composite preform at a second temperature to provide the multi-material fiber. In some implementations, the glass transition temperature of the second preform is less than the glass transition temperature of the core preform and/or the second temperature is less than the glass transition temperature of the core preform. In some applications, the first drawn fiber includes one or more electrically-connectable devices and one or more electrical conductors in electrical communication with the electrically-connectable device(s). In some variations, the method may also include interlacing the multi-material fiber with a plurality of additional fibers to form a textile.

In an eighth aspect, embodiments of the present invention relate to a textile. In some embodiments, the textile includes one or more multi-material fibers and additional fibers interlaced with the multi-material fiber(s). In some implementations, the multi-material fiber includes a composite material, an electrically-connectable device disposed within the composite material, and one or more electrical conductors disposed within the composite material and in electrical communication with the electrically-connectable device. Preferably, the composite material is manufactured from a first preform material and a second preform material encasing the first preform material, wherein the first preform material has a first glass transition temperature and the second preform material has a second glass transition temperature that is less than the first glass transition temperature. In some variations, the electrically-connectable device and the electrical conductor(s) are disposed in the first preform material.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 14 shows a flow chart of a second method of manufacturing a composite multi-material fiber in accordance with some embodiments of the present invention;

FIG. 15A shows an image of a hollow thermoplastic elastomer (TPE) preform for use in the method of FIG. 14 in accordance with some embodiments of the present invention;

FIG. 15B shows an image of a drawn multi-material fiber within a substantially round hollow TPE preform for use in the method of FIG. 14 in accordance with some embodiments of the present invention; and FIG. 15C shows an image of a drawn multi-material fiber within a substantially rectangular hollow TPE preform for use in the method of FIG. 14 in accordance with some embodiments of the present invention.

DETAILED DESCRIPTION

Preform-to-Fiber Draw Process

Figure 1A:
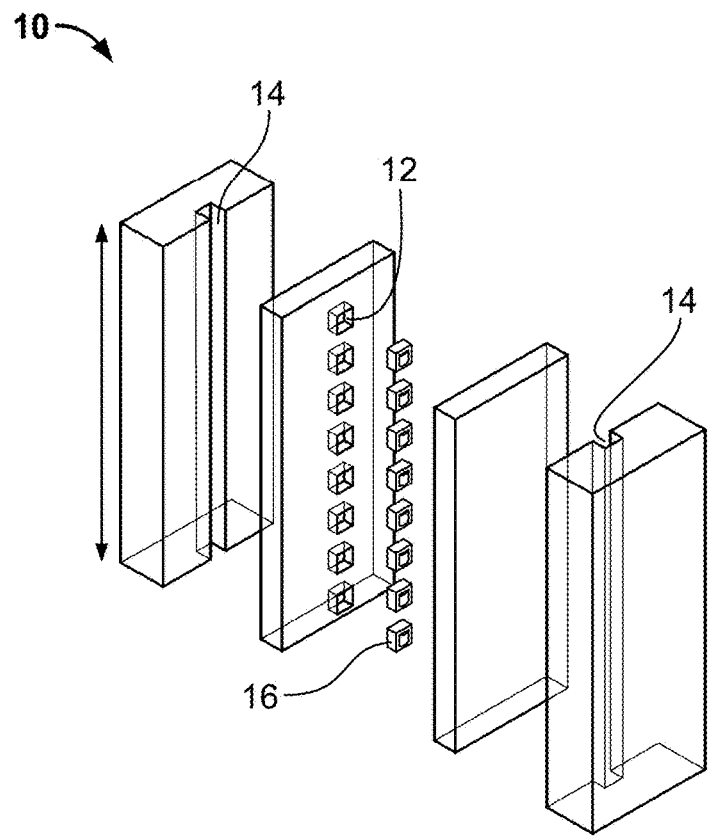
FIG. 1A shows a schematic of a preform assembly in accordance with some embodiments of the present invention.

Multi-material fibers may be drawn using standard thermoplastic draw techniques, such that a plurality of semiconductor devices may be embedded in a single (e.g., drawn) fiber. Although the invention will be described in connection with multi-material fibers manufactured be a draw-down process, that is done for the purpose of illustration, rather than limitation. For example, as an alternative to a drawn fiber, the invention may use electronic strips that are not drawn. In some embodiments, the draw process includes preparing or assembling a preform and then thermally drawing the fiber from the preform. For example, in some applications, to prepare the preform, a rectangular or square preform may be assembled using sheets and bars of a thermoplastic material that, preferably, satisfies optical and mechanical specifications of the end application. Exemplary thermoplastic materials for the preform may include, for the purpose of illustration and not limitation: polycarbonate (PC), polyarylsulfones (PSU), polyetherimide (PEI), polyethylene terephthalate (PET), cyclic olefin copolymer (COC), and the like. In a process known as consolidation, the component pieces of the preform may be stacked together and heated (e.g., to a glass transition temperature of the preform material) using a hot press or similar device in order to fuse, by heat and pressure, the various layers together.

Prior to or while a preform is being assembled, the components of the preform may be cleaned and moisture removed. Moisture may be removed from the preform components in advance of preform assembly by drying in a vacuum oven at elevated temperature for 1-2 weeks.

In a next step, the preform may be mounted to a draw tower within, for example, a three-zone furnace; spools containing electrical conductors and other wire(s) may be disposed above the draw tower. In the draw tower, the thermoplastic material of the preform may be heated (e.g. at or near its glass transition temperature ($T_g$)) until it begins to flow under the force of the weight or mass body attached to the bottom of the preform. As the fiber is drawn from the preform, each of the elongate wires on the spools align with semiconductor devices, such that, in some applications, a plurality of (e.g., two) electrical conductors physically contact an obverse face of the semiconductor device, and, advantageously create an electrical communication with respective electrodes on the semiconductor device. Optionally, a third wire (and/or additional wires) maybe drawn so as to physically contact the reverse face of the semiconductor without establishing any electrical contact. Contact between the two electrical conductors against the obverse face and the third wire against the reverse face captures the semiconductor device between the three elongate wires, supporting the semiconductor device within the drawn fiber.

Once a fiber emerges from the furnace it may be attached to a capstan/winder system, which winds the drawn fiber at a controlled rate. The temperature of the furnace coupled with the winding rate and the rate at which the preform is lowered into the furnace controls the overall diameter of the fiber.

Figure 1B:
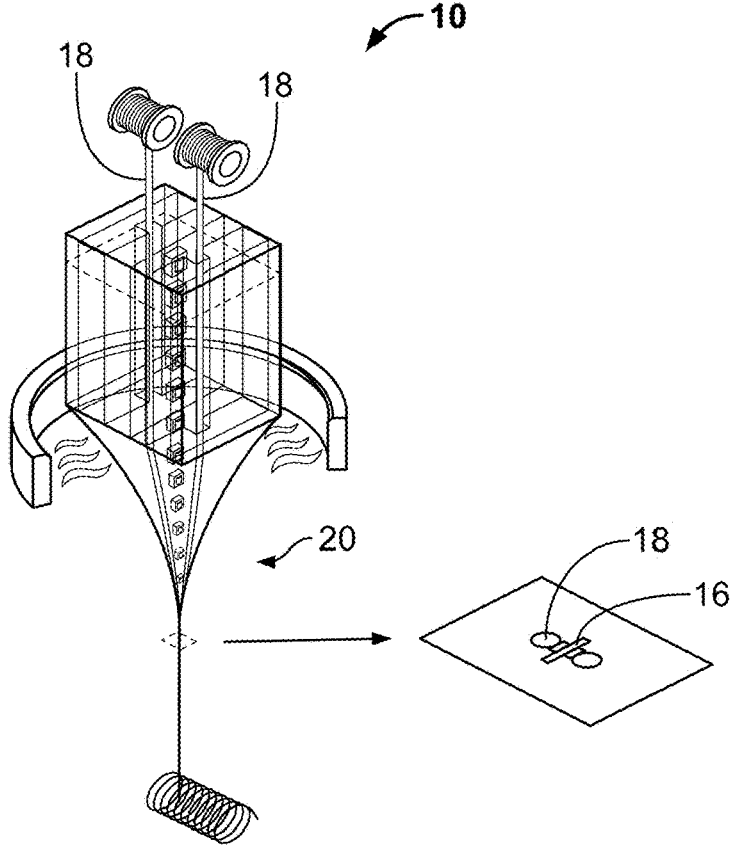
FIG. 1B shows a schematic of a preform-to-fiber draw process in accordance with some embodiments of the present invention.

More particularly, referring to FIGS. 1A and 1B, during multi-material fiber manufacture, a (e.g., thermoplastic) preform 10 maybe heated to or near its glass transition temperature ($T_g$) as the preform 10 is systematically drawn to produce a drawn fiber 20.

Advantageously, prior to the drawing activity, a plurality of slots 12 and a plurality of conduits 14 may be formed in the preform 10; semiconductor devices 16 may be inserted into the slots 12 and electrical conductors 18, as well as other wires, may be inserted in the conduits 14. Conduits 14 for the electrical conductors 18 (and other wires) may be slot-milled through the longitudinal length of the preform 10. In some variations, to prevent a conduit(s) 14 from collapsing during subsequent consolidation steps, a (e.g., PTFE) tube may be inserted into the conduit(s) 14. Once the conduit(s) 14 have been prepared, any inserted tube(s) may be removed and electrical conductors 18 (and other wires) installed in or passed through each conduit(s) 14.

As the preform 10 is drawn, the electrical conductors 18 (and other wires) may be fed into the preform 10 whose form is increasing axially and decreasing radially. As the cross-sectional dimensions continue to decrease, the distance between the electrical conductors 18 (and other wires) and the semiconductor devices 16 also decreases, until the distance between the semiconductor devices 16 and the electrical conductors 18 (and other wires) is less than about the thickness of the semiconductor devices 16. When this occurs, the electrical conductors 18 (and other wires) are in physical contact with the semiconductor devices 16 and, more preferably, each of the electrical conductors 18 is in physical contact with a respective electrode 24 (FIG. 4) on the semiconductor devices 16, completing an electrical circuit.

Advantageously, this fiber draw process is capable of manufacturing multi-material fibers 20 having a plurality of semiconductor devices 16 connected in parallel. Mechanical bonds or connections between the electrical conductors 18 and the electrodes 24 on each of the semiconductor devices 16 provide electrical communication therebetween. Since the bonds are only mechanical in nature, in some instances, small mechanical forces applied to the semiconductor devices 16 and/or to the electrical conductors 18 may cause the electrical connections to fail. Hence, incorporation of multi-material fibers 20 into a textile via conventional machine integration that applies mechanical forces to the multi-material fibers 20 (e.g., by weaving, by knitting, and the like) may be difficult. Moreover, multi-material fibers 20 may fail in use cases that include bending motion (e.g., washing, drying, and the like). Heretofore, mechanical connections between electrical conductors 18 and electrodes 24 on semiconductor devices 16 were used exclusively in the preform-to-fiber draw process. Indeed, due to the nature of the preform-to-fiber draw process, metallurgical bonds were unknown.

Formation of Metallurgical Bonds During the Fiber Draw Process

Figure 2:
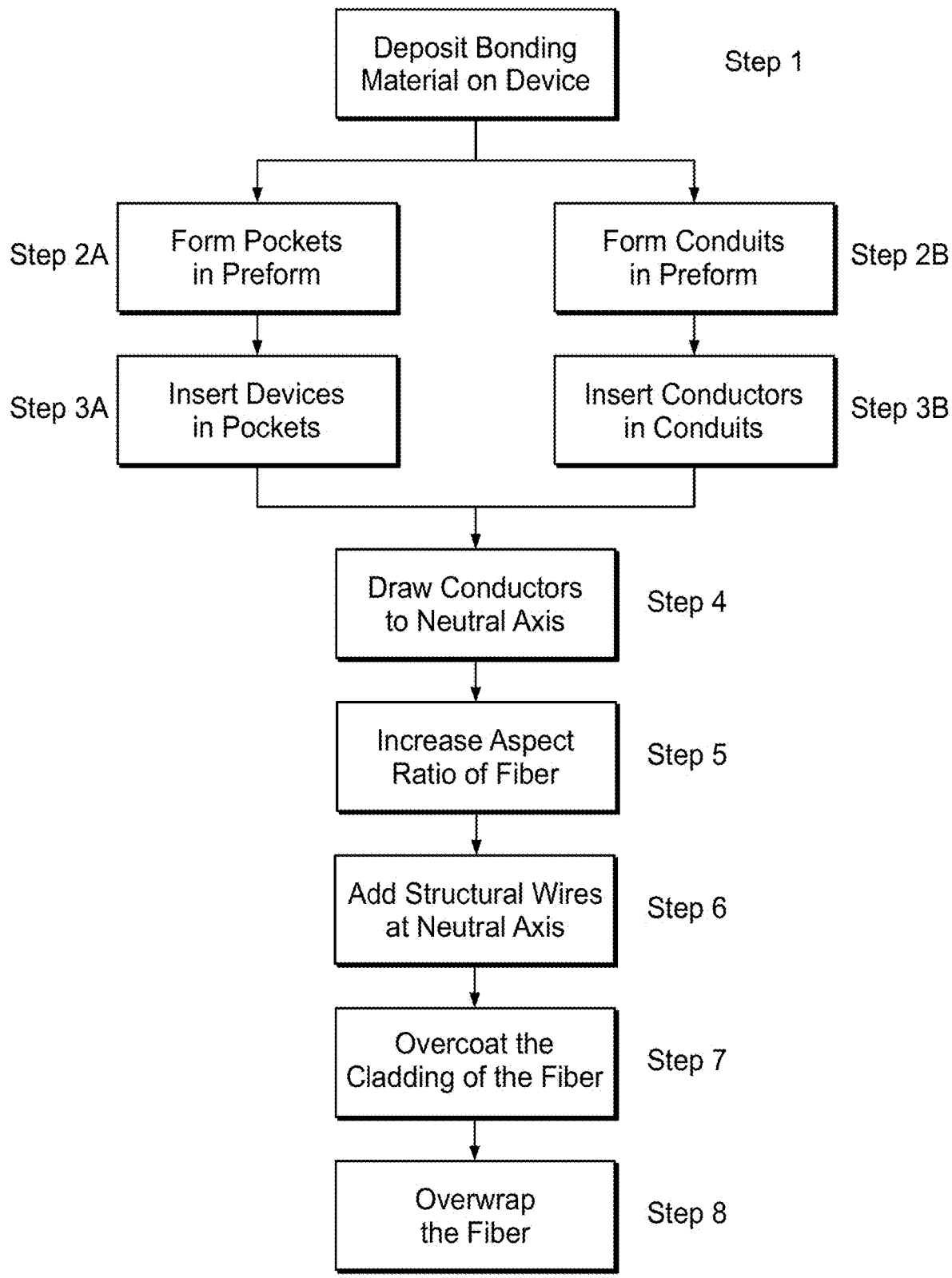
FIG. 2 shows a flow chart of a first method of manufacturing a multi-material fiber in accordance with some embodiments of the present invention.
Figure 4:
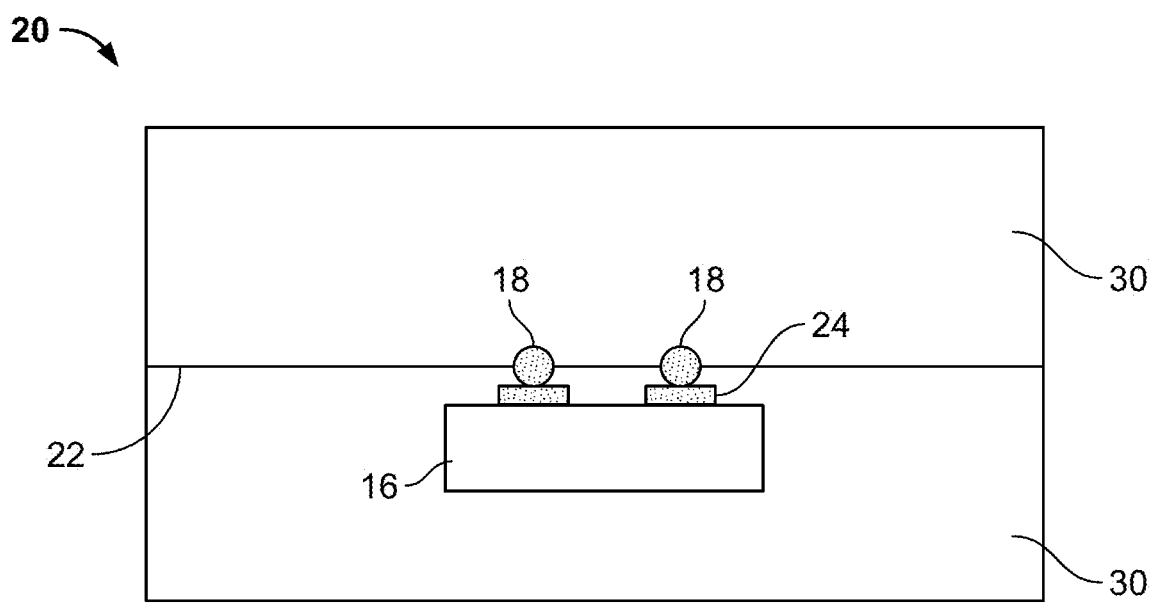
FIG. 4 shows a cross section of a drawn multi-material fiber having a high aspect ratio and electrical conductors located at the neutral axis of the drawn multi-material fiber in accordance with some embodiments of the present invention.

Referring to FIGS. 2 and 4, a method of manufacturing a multi-material fiber 20 via a preform-to-fiber draw process that includes metallurgical bonding electrical conductors 18 to electrodes 24 on the semiconductor devices 16 during the drawn-down process is shown. In a first step, the process includes depositing a low-melting point bonding material, e.g., a metal alloy solder such as a tin:bismuth solder containing about 48 percent tin and about 52 percent bismuth (48Sn:52Bi), onto the electrodes 24 of the semiconductor devices 16 (STEP 1). Preferably, the melting temperature (MP) of the bonding material is matched to the glass transition temperature ($T_g$) of the preform material, such that the heat used to thermally draw the preform 10 is also sufficient to raise the temperature of the bonding material to its melting point, which produces a metallurgical bond when the electrical conductors 18 converge on the electrodes 24 of the semiconductor devices 16.

In some implementations, a hot press may be used to deposit (e.g., about 2-10 microns of) the bonding material on the electrodes 24. To prevent potential shorting of the semiconductor devices 16, application of the bonding material should be controlled to contain the deposited bonding material proximate the respective electrodes 24. For example, if a hot press is used to deposit the bonding material, the vertical (or z-travel) displacement of the dispensing nozzle of the hot press may be limited to prevent displacement of the bonding material.

Prior to fiber drawing, a plurality of pockets 12 (STEP 2A) and a plurality of conduits 14 (e.g., two) (STEP 2B) may be formed in the preform 10, so as to ensure convergence of the electrical conductors 18 onto respective electrodes 24 on the semiconductor devices 16. Pockets 12 for the semiconductor devices 16 may be end-milled in the upper face of the preform 10 at discrete locations.

Semiconductor devices 16 may then be inserted in each of the pockets 12 (STEP 3A) and electrical conductors 18 may be inserted in each of the conduits 14 (STEP 3B). Centering the semiconductor devices 16 within the pockets 12 formed in the preform 10 with respect to the electrical conductors 18 may prevent smearing of the bonding material during convergence, i.e., when the electrical conductors 18 converge onto the electrodes 24 of the semiconductor devices 16. In some variations, the electrical conductors 18 may be manufactured of copper or tungsten. For stronger bond formation, an extra-high tension wire, e.g., a silver-coated copper alloy wire, such as XHTW manufactured by Elektrisola GmbH & Co. KG of Reichshof-Eckenhagen, Germany, may be used.

Location of Electrical Conductors at the Neutral Axis of the Drawn Fiber

Figure 3:
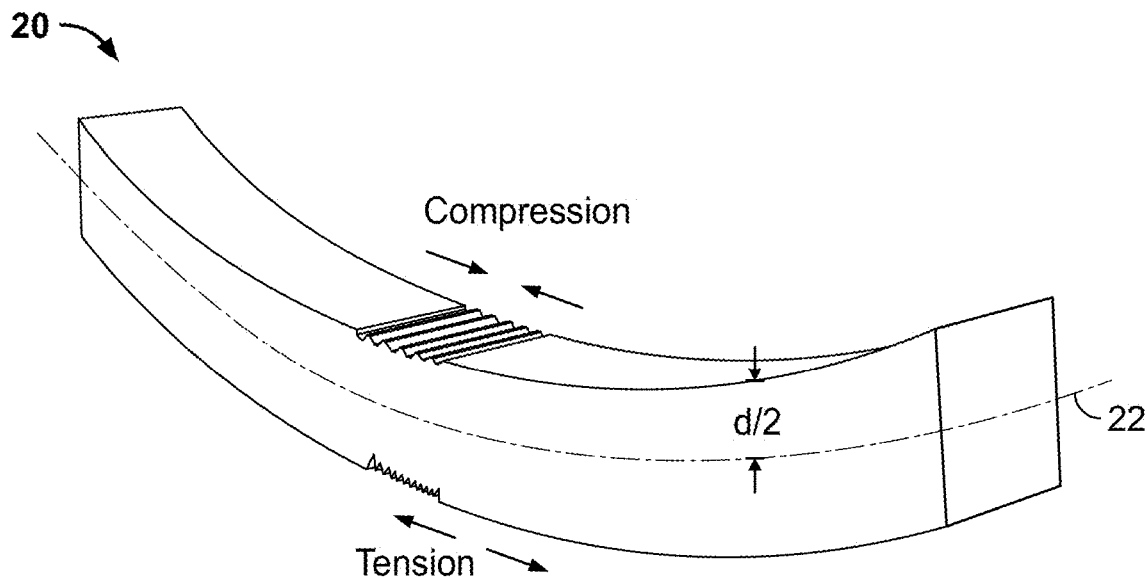
FIG. 3 shows a schematic of tensile and compressive failure modes of a member subjected to bending.

Failure due to breakage of the electrical conductors 18 and/or breakage of the electrical contact between the electrical conductors 18 and the electrodes 24 of the semiconductor devices 16 (e.g., due to ordinary wear and tear, during washing, drying, and the like) can be a leading mode of failure of the multi-material fiber 20. More specifically, as shown in FIG. 3, as the multi-material fiber 20 is subjected to or undergoes bending, a portion of the multi-material fiber 20 and the electrical conductors 18 is compressed and another portion of the multi-material fiber 20 and the electrical conductors 18 is placed in tension. The portion of the multi-material fiber 20 in tension causes the electrical conductors 18 to elongate, introducing a defect in the electrical conductors 18, which, with repeated bending, weakens the electrical conductors 18 and the multi-material fiber 20. Bending may also affect the metallurgical bonds that experience a touch sensitivity that can cause deterioration or breakage of the bond between the electrical conductors 18 and the electrodes 24. Ultimately, repeated bending may cause the electrical conductors 18 to break or the bond between the electrical conductors 18 and the electrodes 24 to deteriorate.

To address the mode of failure due to bending electrical conductors 18, the fiber draw process may be adapted. For example, conduits 14 in the preform 10 may be prepared (STEP 2B) and electrical conductors 18 may be installed in the conduits 14 in the preform 10 (STEP 3B), such that, as shown in FIGS. 3 and 4, at the completion of the fiber draw-down process, the electrical conductors 18 are located at or near the neutral axis 22 of the multi-material fiber 20 (STEP 4). Alternatively, after drawing the multi-material fiber, the connection between the electrical conductors 18 and the corresponding electrodes 24 of the electrically-connectable device 16 may be located substantially along the neutral axis 22 of the multi-material fiber 20. By prearranging the electrical conductors 18 and drawing down the preform 10 so that, at convergence, the electrical conductors 18 rest at or near the neutral axis 22 of the drawn multi-material fiber 20 (STEP 4) or, in the alternative, the connections between the electrical conductors 18 and the corresponding electrodes 24 of the electrically-connectable device 16 are located substantially along a neutral axis 22 of the multi-material fiber 20, the compressive or tensile forces acting on the electrical conductors 18 are minimized. Indeed, the extent to which electrical conductors 18 or, in the alternative, the extent to which the connections between the electrical conductors 18 and the corresponding electrodes 24 of the electrically-connectable device 16 would be subject to compressive or tensile forces is proportional to the distance of the electrical conductors 18 (or the connections) from the neutral axis 22. Hence, the closer the electrical conductors 18—and, more specifically, the central axis of the electrical conductors 18—or, in the alternative, the closer the connections between the electrical conductors 18 and the corresponding electrodes 24 of the electrically-connectable device 16 are to the neutral axis 22 of the multi-material fiber 20, the less the electrical conductors 18 (or the connections) are subjected to the deleterious effects of repeated compression or tension.

Figure 5:
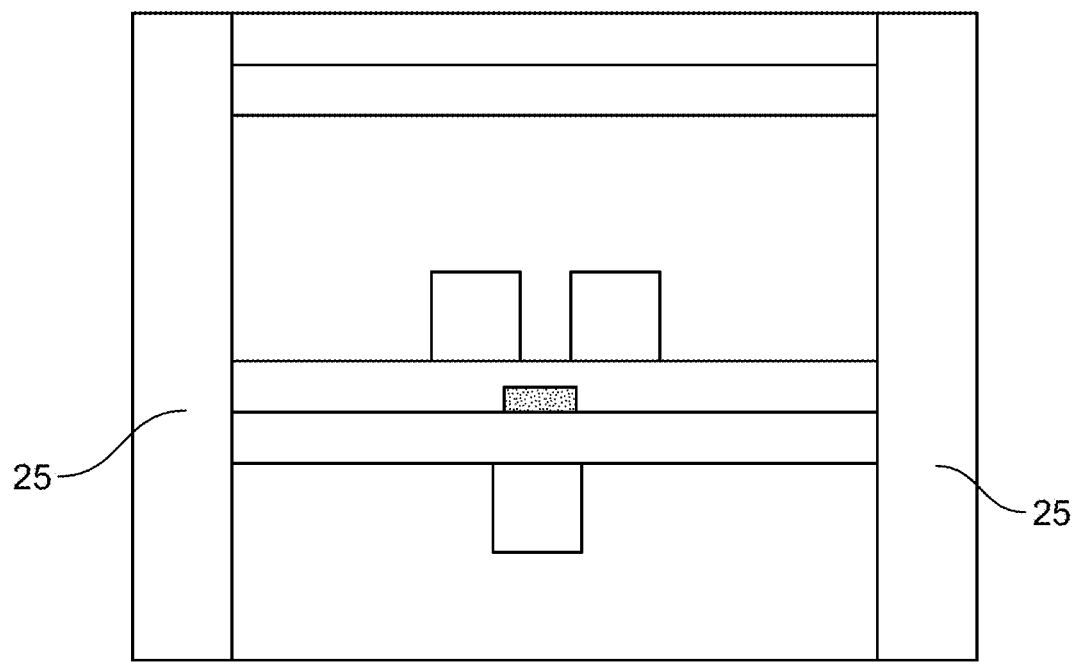
FIG. 5 shows a cross section of a drawn multi-material fiber having a high aspect ratio, electrical conductors located at the neutral axis of the drawn multi-material fiber, and sidewalls in accordance with some embodiments of the present invention.

Although positioning the electrical conductors 18 (or the connections), after convergence, at or near the neutral axis 22 of the drawn multi-material fiber 20 (STEP 4) makes the drawn multi-material fiber 20 more robust and survivable, this is only true in a single plane that subjects the drawn multi-material fiber 20 to tensile and compressive loads. Thus, to address the stresses and strains that may be generated when the drawn multi-material fiber 20 is subject to torsion, the drawn multi-material fiber 20 may be designed to have a relatively high (e.g., 1.1:1 to 2.7:1) aspect ratio (STEP 5) of the width (W) of the drawn multi-material fiber 20 to the height (H) of the drawn multi-material fiber 20. By increasing the aspect ratio (STEP 5), out-of-plane torsion and other forces will not expose the electrical conductors 18 to out-of-plane tension. The relatively high aspect ratio (as shown in FIG. 4) may be provided in the design of the multi-material fiber 20, so that as the multi-material fiber 20 is drawn, the resulting multi-material fiber 20 is somewhat elliptical, rectangular, or oval, so as to have a longer width than a height. In the alternative, as shown in FIG. 5, additional sidewalls 24 may be attached, adhered, or bonded to the drawn multi-material fiber 20 (STEP 5) to ensure that the width of the multi-material fiber 20 is greater than its height.

Figure 6:
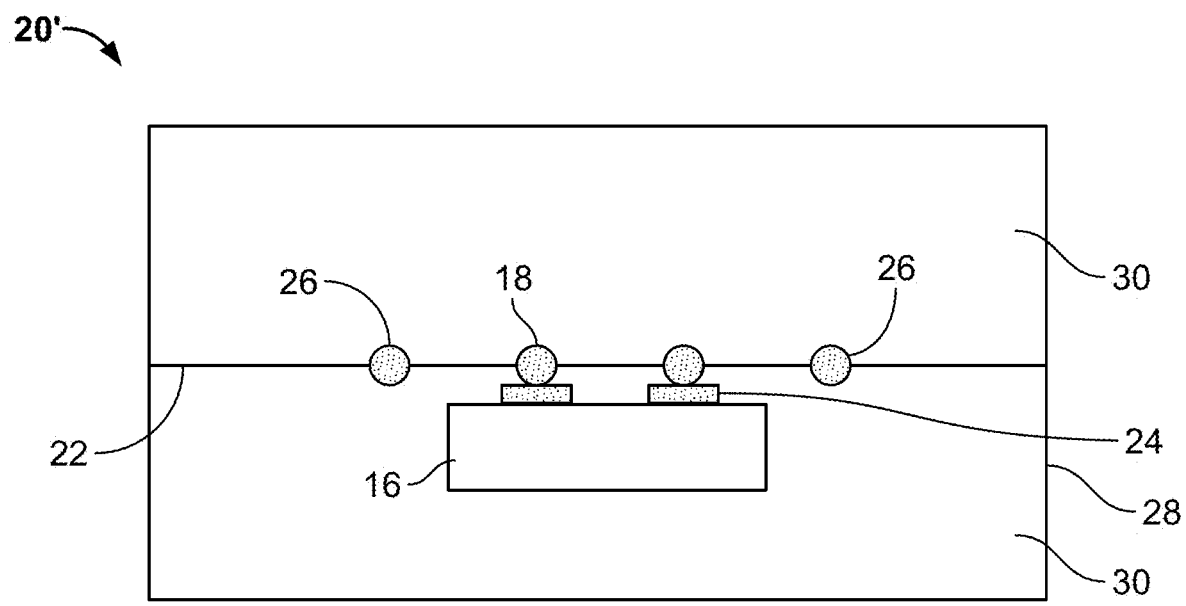
FIG. 6 shows a cross section of a drawn multi-material fiber having a high aspect ratio and electrical conductors and outer wires located at the neutral axis of the drawn multi-material fiber in accordance with some embodiments of the present invention.

Optionally, as shown in the multi-material fiber 20' illustrated in FIG. 6, to further restrict bending along the neutral axis 22 plane, i.e., torsion, outer (e.g., structural) wires 26 may be incorporated in the preform 10 (STEP 6) during the thermal draw process. In some embodiments, each outer (e.g., structural) wire 26 may be a high tension wire (e.g., wires made from aramids, dyneema, tungsten, and so forth) that is installed in a corresponding conduit 14 in the preform 10, such that, after the multi-material fiber 20' has been thermally drawn, each outer (e.g., structural) wire 26 is located at or near the neutral axis 22 of the drawn multi-material fiber 20', between the outer surface 28 of the drawn multi-material fiber 20' and a corresponding electrical conductor 18.

Environmental Barriers and Yarn Wrapping for Drawn Fibers

Due to the brittle nature of most thermoplastics, kinking may occur when the multi-material fiber 20 is bent beyond a critical radius of curvature. Kinking produces strains in the thermoplastic material or cladding 30 that surrounds and encases the devices 16 and the electrical conductors 18. Through fatigue due to kinking, the cladding 30 may develop local defects, which can lead to failure of the multi-material fiber 20'. Since the thermoplastic cladding 30 about the electrical conductors 18 provides resistance against bending, if the cladding 30 fails, over time, the electrical conductors 18 and/or the electrical connections between the electrical conductors 18 and the electrodes 24 are also likely to fail. Accordingly, in a next step, the cladding 30 may be encased in an (e.g., thermoplastic elastomer) overcoating 32 (STEP 7) that is structured and arranged to prevent the multi-material fiber 20 from bending beyond a point that would otherwise lead to kinking without reducing the bend radius of the multi-material fiber 20'. Exemplary overcoating materials 32 include, for the purpose of illustration rather than limitation: polyester.

Crazing is a process by which thermoplastics fail due to the migration of a solvent (e.g., water) into the cladding 30 matrix. For example, through fatigue caused by repeated or cyclical kinking, tension cracks may appear in the surface of the cladding 30, providing a means of ingress for solvents. Solvent migration within the cladding 30 matrix locally weakens (at the point of migration) the polymer, leading to stress cracking and failure. In order to prevent ingress of solvents into the thermoplastic cladding 30, the cladding 30 may, optionally, be coated with a hydrophobic, thermoplastic elastomer barrier material 32 (STEP 7).

Figure 7:
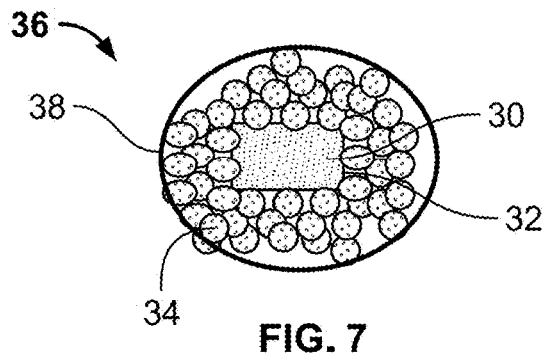
FIG. 7 shows a schematic of a cross-section of a yarn including a drawn multi-material fiber with a high-tensile strength fiber (e.g., aramids, dyneema, basalt, and the like) overwrapping in accordance with some embodiments of the present invention.

As multi-material fibers 20 are intertwined with other fibers, e.g., using a machine or other mechanical means, to produce a fabric or textile (e.g., by weaving, knitting, and so forth), the multi-material fibers 20 may be subjected to large tensile forces. To mitigate these large tensile forces, as shown in FIG. 7, the multi-material fibers 20 may be wrapped with high-tensile strength (e.g., aramids, dyneema, basalt, and the like) fibers 34 to provide a yarn 36 having an extremely high-tensile strength (STEP 8). The yarn 36, in turn may be overcoated with a (e.g., polyester) material 38. In some applications, the multi-material fiber may include a composite yarn that includes, for example, a high modulus and/or high strength mono- or multi-filament yarn placed in parallel with the multi-material fiber. Advantageously, the composite yarn may be overwrapped with similar or other textile yarns.

Post-Draw Placement of Semiconductor Devices

Figure 8:
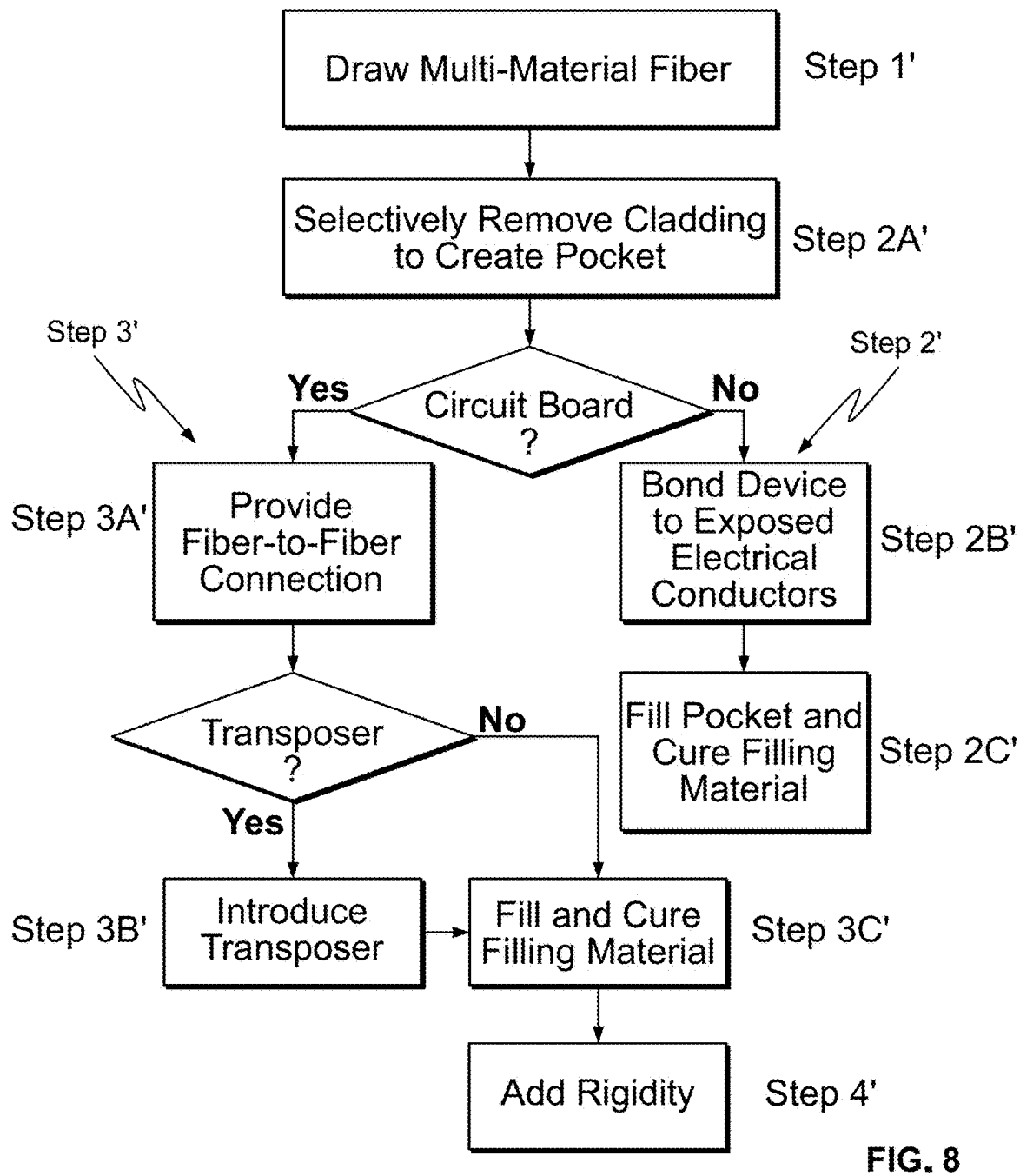
FIG. 8 shows a flow chart of a second method of manufacturing a multi-material fiber in accordance with some embodiments of the present invention.
Figure 9:
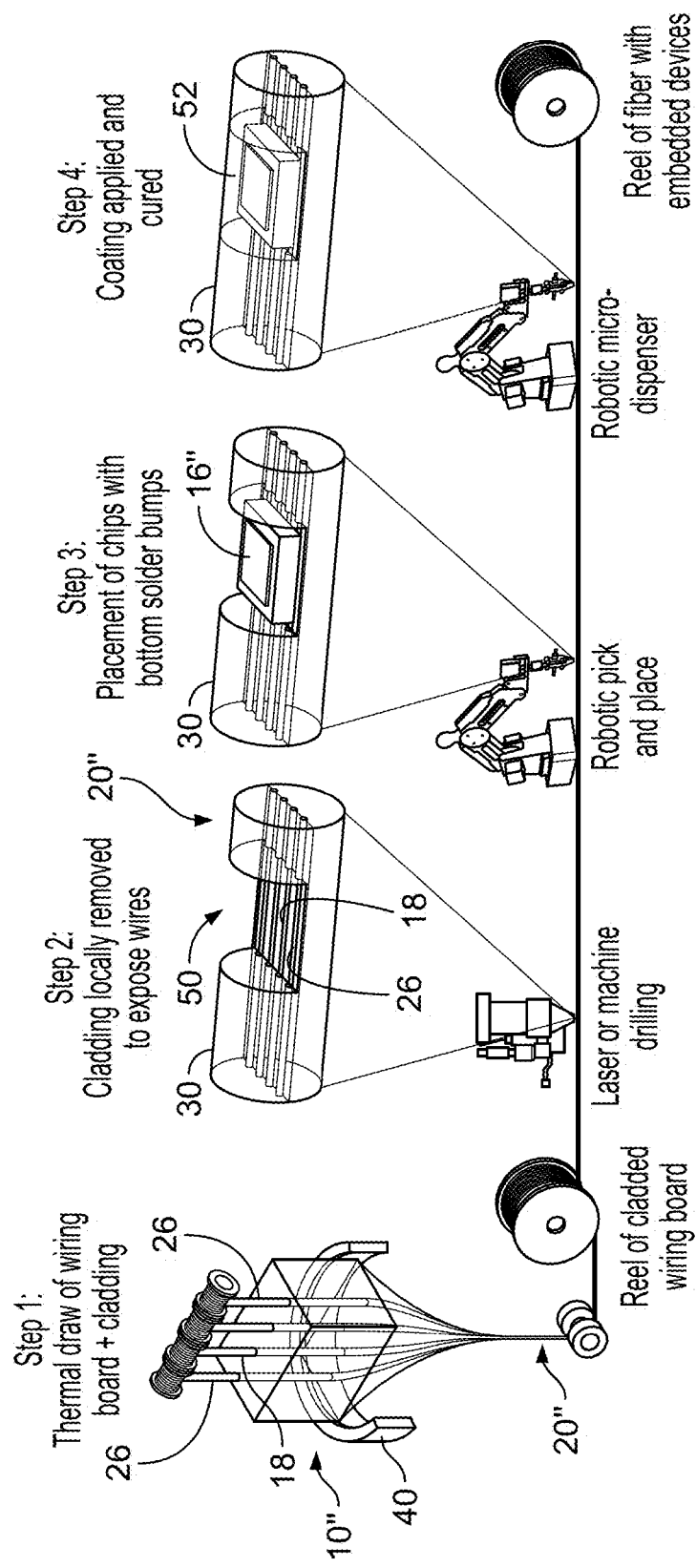
FIG. 9 shows a schematic of an apparatus for performing the second method of manufacturing a multi-material fiber depicted in FIG. 8 in accordance with some embodiments of the present invention.

Incorporation of semiconductor devices into the preform material prior to the thermal draw process may, in some instances, affect the accuracy of semiconductor location at the fiber level. Moreover, with pre-draw placement of semiconductor devices, the density of devices may be severely limited by the draw-down ratio. As a result, in some instances, as shown in FIGS. 8 and 9, it may be preferable to manufacture a multi-material fiber 20" by, first, drawing the (e.g., PEI, borosilicate glass, and so forth) fiber 20" with appropriate electrical conductor geometries (STEP 1') and then, once drawn, installing the semiconductor devices 16" at desired locations (STEP 2'), which, advantageously, may include devices 16' that are placed adjacent to one another.

While thermally-drawing the multi-material fiber 20" from the preform material 10", the tension on the electrical conductors 18 and other wires 26 should be balanced and it is important, if not critical, that the preform material 10" should remain centered within the furnace 40 during drawdown. For the milling process used to create pockets 50 in the drawn multi-material fiber 20", care should be taken in the drawing process to minimize fluctuation of the outer diameter (OD) of the drawn fiber 20".

More specifically, the drawn multi-material fiber 20" may be modified (e.g., using a laser, a (e.g., CNC end-) milling machine, and the like) to selectively remove cladding material 30 from the drawn fiber 20" (STEP 2A'). Doing so forms a pocket 50 at discrete locations in the drawn multi-material fiber 20", so as to expose the electrical conductors 18 and other wires 26 that are, preferably, disposed at the neutral axis of the multi-material fiber 20".

With the electrical conductors 18 and other wires 26 exposed, the electrodes of a semiconductor device 16" may be placed against and metallurgically-bonded (e.g., by heating each solder-coated electrode with a soldering iron) to corresponding electrical conductors 18 (STEP 2B'). Advantageously, the post-draw creation of pockets 50 in the drawn multi-material fiber 20" makes it easier to appropriately and correctly align the semiconductor device 16" vis-à-vis the electrical conductors 18. Those of ordinary skill in the art can appreciate that, due to the post-draw soldering operation, the preform (i.e., cladding) material 30 should be selected so that the glass transition temperature of the preform (i.e., cladding) material 30 is greater than the melting point of the bonding material. Once the electrodes of the semiconductor device 16" have been metallurgically-bonded to the electrical conductors 18, a filling material or encapsulant 52 (e.g., a photocurable epoxy) may then be placed in the pocket 50 and (e.g., ultraviolet (UV)) cured (STEP 2C') to protect the underlying semiconductor device 16" and electrical conductors 18. The filling material 52 hardens or sets depending on the composition of the encapsulate. For example, a photocured epoxy may be used in connection with light curing and transfer molding.

In order to fabricate a textile that includes, for example, circuit boards, local interconnections between multi-material fibers 20" may be formed (STEP 3') by selectively removing cladding material 30 from each of the drawn multi-material fibers 20" proximate their point of intersection (STEP 2A'), so as to expose some portion of each of the electrical conductors 18. Electrical communication between the exposed portions of each electrical conductor 18 may then be effected (STEP 3A') to provide a fiber-to-fiber connection. In some applications, one or more of an interposer or a transposer may be introduced between the exposed portions of the electrical conductors 18 (STEP 3B'). Once the exposed portions of the electrical conductors 18 have been electrically coupled, a filling material or encapsulate 52 (e.g., a photocurable epoxy) may then be placed into the area that was removed and (e.g., ultraviolet (UV)) cured (STEP 3C') to protect the electrical conductors 18 and the connection therebetween.

Figure 10:
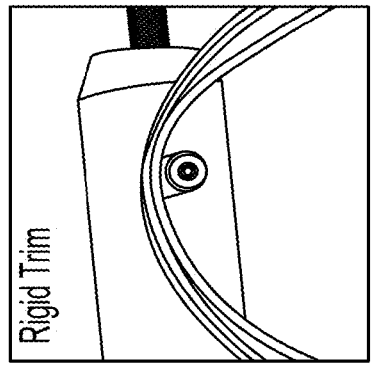
FIG. 10 shows an exemplary garment-level solution for limiting bending of a textile in accordance with some embodiments of the present invention.
Figure 10:
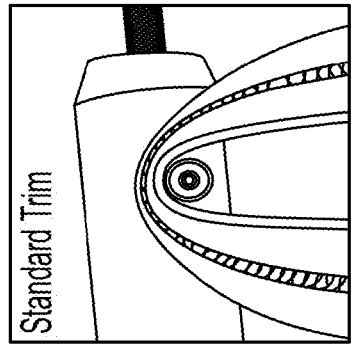

Once a multi-material fiber(s) 20" has been integrated into a textile or garment, as shown in FIG. 10, devices for adding rigidity to the textile or garment (e.g., tubing, stiffeners, backing, and the like) may be incorporated into the textile of garment (STEP 4'). The devices for adding rigidity limit the bending dynamic making the fabric stronger.

Composite Device Fibers

Thermoplastic polycarbonate (PC) possesses good tensile strength, optical transparency, and thermomechanical properties and, hence, is an important material for fabricating multi-material fibers. Disadvantageously, however, PC is relatively rigid; hence, PC fibers tend to kink when a certain bend radius (e.g., a critical bend radius) is exceeded. Kinking may result from plastic deformation due to large tensile strain that the outermost portion of the fiber undergoes during bending. Accordingly, in some embodiments of the present invention, the multi-material fiber may include a core material composed of a rigid thermoplastic material for housing the semiconductor device(s) and electrical conductors (or other wires) in combination with an outer sheath composed of a thermoplastic elastomer (TPE) material that encases the core material. Because TPE materials typically have large elastic moduli and, since the encasing TPE material is located at the points of highest tensile and compressive strain, these composites can be reversibly (i.e., elastically) bent without plastic deformation.

While die coating, melt spinning, and other overcoating processes or techniques may be used to manufacture such a multi-material fiber, there are particular advantages of thermally drawing a composite preform to produce a multi-material fiber. Moreover, such a thermal-drawing process may also be used in connection with manufacturing optical lenses, interconnects, multi-material sheaths, and so forth.

Figure 11:
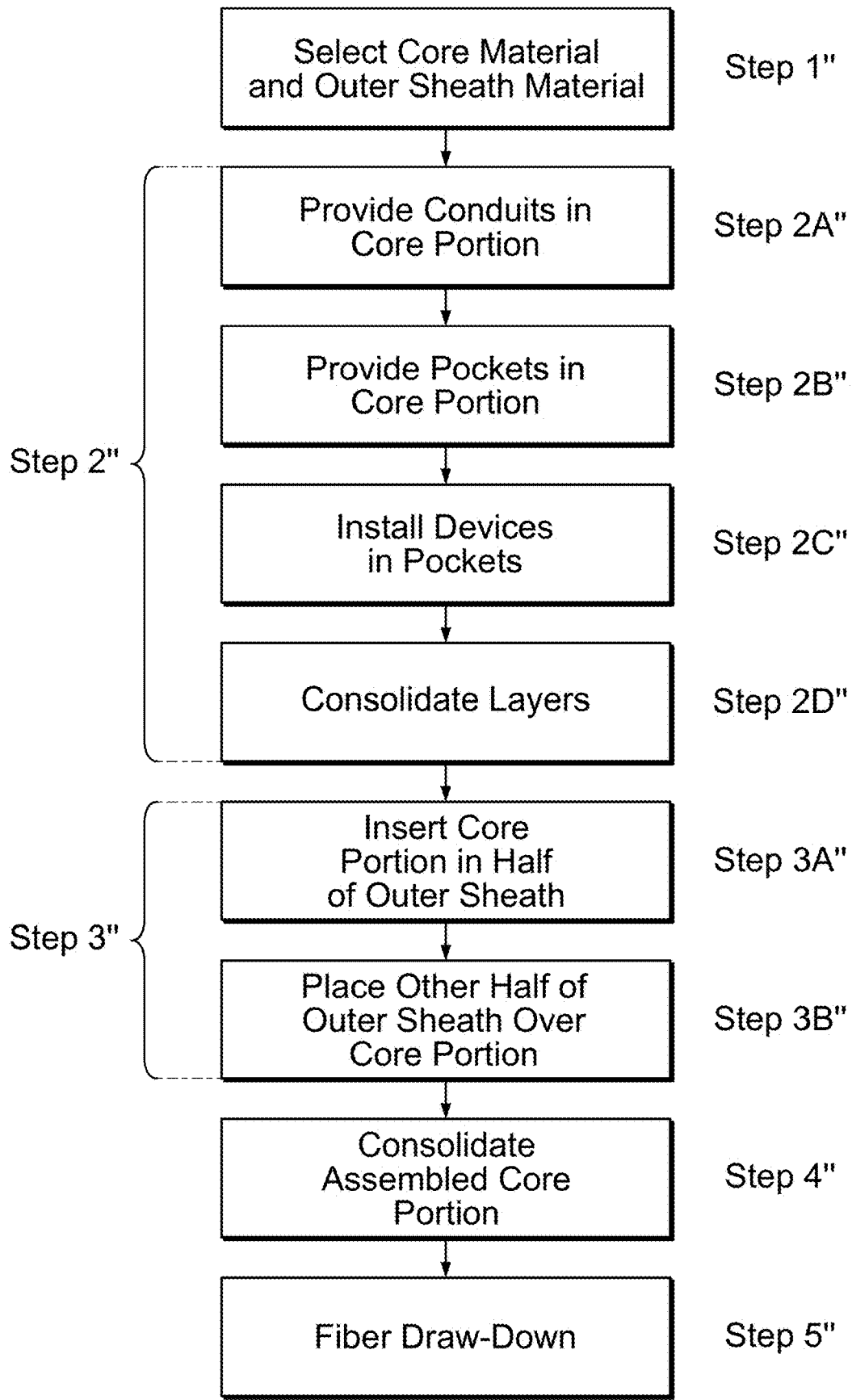
FIG. 11 shows a flow chart of a first method of manufacturing a composite multi-material fiber in accordance with some embodiments of the present invention.

Referring to FIG. 11, a flow chart for a first exemplary method of manufacturing composite multi-material fibers and, more specifically, (e.g., kink-resistant) fibers having complex, three-dimensional architectures is shown. The first process is a co-drawing process in which a core material composed of a rigid thermoplastic material and an outer sheath composed of a less-rigid, TPE material may be used. In a first step, different materials for the core and the outer sheath are selected (STEP 1"). To ensure that the viscosities of the two materials will act similarly at a given temperature, a core material and an outer sheath material having similar or substantially similar glass transition temperatures ($T_g$) may be provided (STEP 1"). For example, for the purpose of illustration rather than limitation, the materials of the composite may include a cyclic olefin copolymer (COC) or PC for the thermoplastic core material and an elastomeric-cyclic olefin copolymer (e-COC) for the TPE outer sheath.

Referring to FIGS. 12A-12C and FIGS. 13A and 13B, once the core material and outer sheath materials have been decided upon, the former may be used to fabricate the core portion 60, which, preferably, is a relatively rigid core portion 60. Advantageously, a rigid core portion 60 maintains good mechanical contact between the electrodes of the semiconductor devices 72 and the corresponding electrical conductors 74 and prevents the non-elastic electrodes and buses from breaking due to excessive strain that may be caused by bending the drawn composite fiber 70 in the tensile direction. In some implementations, the core portion 60 may be manufactured using a multi-layer approach (STEP 2"). For example, the core portion shown in FIGS. 13A and 13B includes three layers 62a, 62b, and 62c: a central layer 62b, and two outer layers 62a, 62c. As part of the multi-layer approach (STEP 2"), conduits 64 for receiving the electrical conductors 74 may be milled in the outer layers 62a, 62c (STEP 2A") and a plurality of pockets 66 for receiving semiconductor devices 72 may be prepared within the central layer 62b (STEP 2B"). Once the pockets 66 have been prepared in the central layer 62b (STEP 2B"), semiconductor devices 72 may be inserted into the pockets (STEP 2C"). The three layers 62a, 62b, and 62c may then be assembled and consolidated (STEP 2D"), e.g., using a hot press machine, so that, after the consolidation, the core 60 consists essentially of a single component.

Figure 12A:
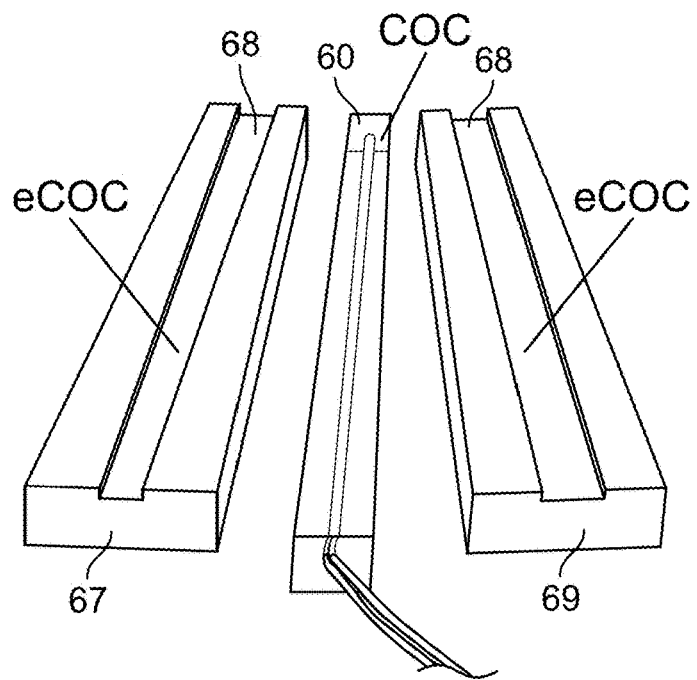
FIG. 12A shows a schematic of a core portion and two clam shell portions for manufacturing a composite multi-material fiber in accordance with some embodiments of the present invention.
Figure 12B:
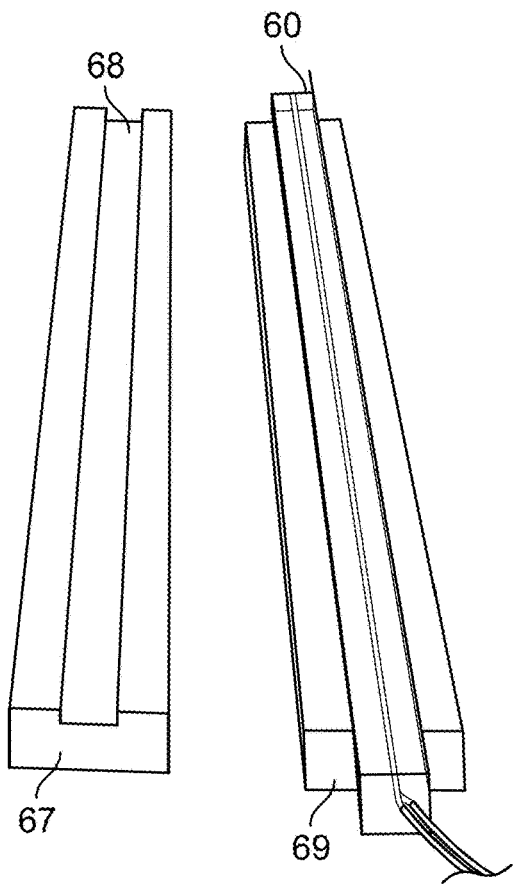
FIG. 12B shows a schematic of the core portion installed in a central channel portion of one of the clam shell portions from FIG. 12A in accordance with some embodiments of the present invention.
Figure 12C:
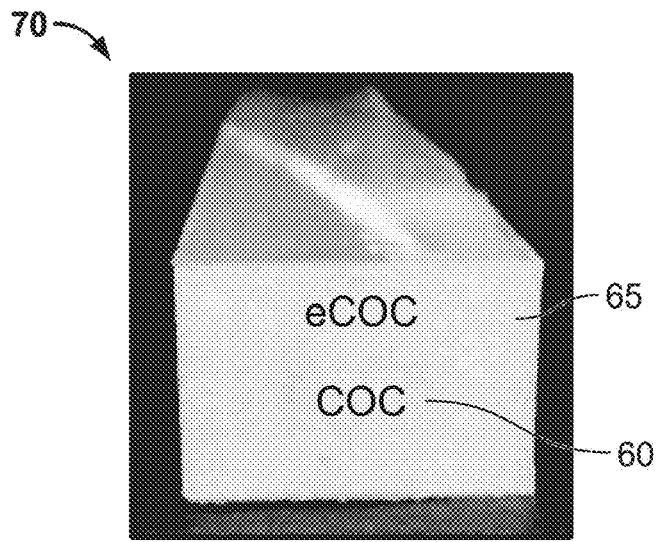
FIG. 12C shows a schematic of the consolidation of the core portion and the two clam shell portions from FIG. 12B in accordance with some embodiments of the present invention.
Figure 13A:
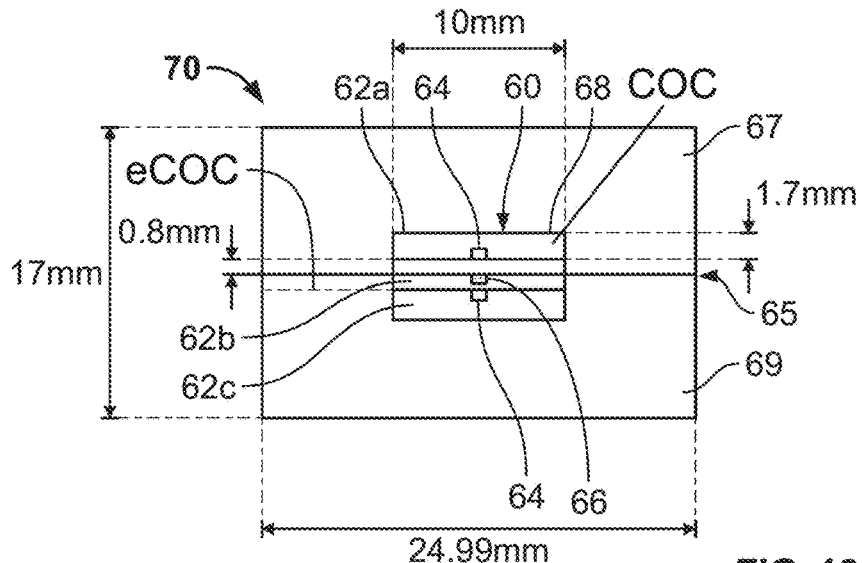
FIG. 13A shows a schematic of a composite preform having a layered core portion encased in an outer shield for manufacturing a multi-material fiber in accordance with some embodiments of the present invention.
Figure 13B:
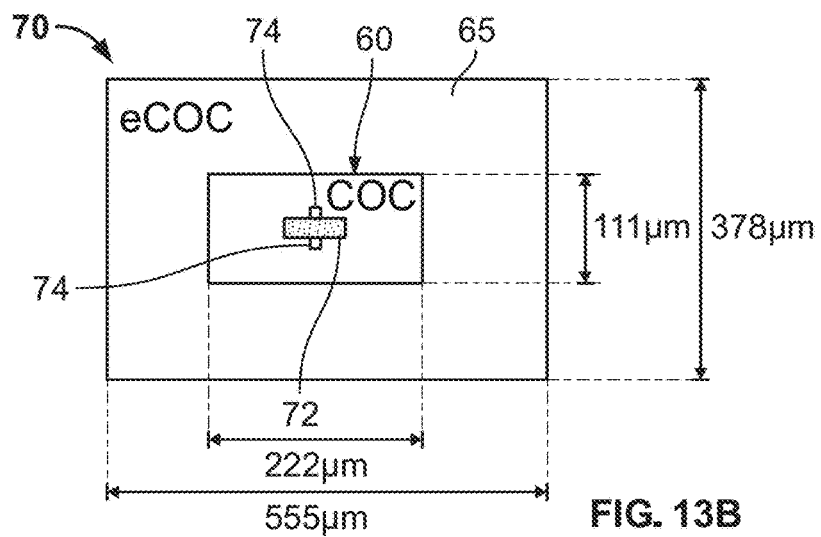
FIG. 13B shows a composite multi-material fiber schematic resulting from thermally drawing the composite preform of FIG. 13A in accordance with some embodiments of the present invention.

In a next step, the consolidated core portion 60 may be inserted within or placed inside of a more flexible outer sheath 65 (STEP 3") (FIG. 13A). In some applications, the outer sheath 65 may include a first clam shell portion 67 and a second clam shell portion 69 that each include a central channel portion 68 that runs the length of each clam shell portion 67, 69. Preferably, the shape of the central channel portions 68, when the clam shell portions 67, 69 are assembled prior to consolidation, is the same or substantially the same (e.g., oval, elliptical, round, square, rectangular, and so forth) as one-half of the shape of the consolidated core portion 60. Once the consolidated core portion 60 has been placed in the central channel portion 68 of the second clam shell portion 69 (STEP 3A"), the first clam shell portion 67 may be placed over the exposed portion of the consolidated core portion 60, such that the exposed portion of the consolidated core portion 60 is disposed within the central channel portion 68 of first clam shell portion 67 (STEP 3B") (FIG. 12C). The assembled core portion 60 and outer sheath 65 may then be consolidated, e.g., using a hot press machine, to produce a composite preform 70 (STEP 4") that may be thermally drawn by a fiber draw process to produce a composite, multi-material fiber (STEP 5").

Alternatively, in a second embodiment of a method of manufacturing a composite multi-material fiber, a rigid, multi-material fiber may be drawn in a first thermal drawing process and then the drawn multi-material fiber may be inserted into a hollow, TPE preform, which combination may then be subjected to a second thermal drawing process. More specifically, referring to FIG. 14 and FIGS. 15A-15C, in this alternative approach, a plurality of electrical conductors (and other wires) and semiconductor devices may be installed (using techniques described herein) in a relatively rigid (e.g., PC) preform material that is, subsequently, thermally drawn-down in a first thermal drawing process to produce a multi-material (e.g., PC) fiber 80 (STEP 1'''). A hollow (e.g., e-COC) preform 85 having a (e.g., round, rectangular, and the like) central opening 82 may also be manufactured (STEP 2'''), such that the dimensions of the central opening 82 are sufficiently large to enable one to install the drawn multi-material fiber 80 within the opening 82 and for the entire length of the hollow preform 85 (STEP 3'''). Preferably, the glass transition temperature of the drawn multi-material fiber 80 is greater than the glass transition temperature of the hollow preform 85 (e.g., about 70 degrees Centigrade greater) to ensure that, during a second thermal drawing process, the dimensions and shape of the drawn multi-material fiber 80 are not changed by the heat in the furnace 40.

The drawn multi-material fiber 80 may then be inserted into and through the opening 82 of the hollow preform 85 (STEP 3''') as shown in FIGS. 15B and 15C and the composite subject to a second thermal drawing process (STEP 4''') in which the furnace temperature is at or near the glass transition temperature of the hollow preform 85 but less than the glass transition temperature of the previously-drawn multi-material fiber 80.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What we claim is:

1. A method of manufacturing a multi-material fiber comprising at least one electrically-connectable device, the method comprising the steps of:
    positioning a first electrical conductor longitudinally within a first conduit provided in a preform material;
    drawing the multi-material fiber by causing the preform material to flow;
    creating at least one pocket in the drawn multi-material fiber to expose the first electrical conductor;
    positioning an electrically-connectable device within the pocket, such that a first electrode on the electrically-connectable device is aligned with the first electrical conductor;
    forming a metallurgical bond between the first electrical conductor and the first electrode; and
    filling the pocket with a material to protect the electrically-connectable device.

2. The method of claim 1 further comprising positioning a second electrical conductor longitudinally within a second conduit provided in the preform material.

3. The method of claim 2, wherein the at least one pocket further exposes the second electrical conductor and the electrically-connectable device is positioned within the pocket such that a second electrode on the electrically-connectable device is aligned with the second electrical conductor.

4. The method of claim 3 further comprising forming a metallurgical bond between the second electrical conductor and the second electrode.

5. The method of claim 1, wherein creating the pocket comprises removing preform material.

6. The method of claim 5, wherein removing preform material comprises using at least one of:
 a laser; or
 a milling machine.

7. The method of claim 1, wherein the pocket is filled with one or more of an encapsulant or a photocured epoxy.

8. The method of claim 1 further comprising minimizing fluctuation of an outer diameter of the drawn multi-material fiber.

9. The method of claim 1 further comprising, before the electrically-connectable device is positioned within the pocket, coating the first electrode with a bonding material.

10. The method of claim 1 further comprising interlacing the drawn multi-material fiber with a plurality of additional fibers to form a textile.

11. The method of claim 10 further comprising:
 removing preform material in a first drawn multi-material fiber in the textile to expose electrical conductors of the first drawn multi-material fiber;
 removing preform material in a second drawn multi-material fiber that, in the textile, intersects the first drawn multi-material fiber to expose electrical conductors of the second drawn multi-material fiber; and
 interconnecting the electrical conductors of the first drawn multi-material fiber to the electrical conductors of the second drawn multi-material fiber.

12. The method of claim 11, wherein interconnecting the electrical conductors of the first drawn multi-material fiber to the electrical conductors of the second drawn multi-material fiber comprises inserting one or more of an interposer or a transposer therebetween.

\* \* \* \* \*